(12) United States Patent
Daly (10) Patent No.: US 10,234,919 B2
(45) Date of Patent: Mar. 19, 2019

(54) ACCESSORY-BASED POWER DISTRIBUTION

(71) Applicant: Microsoft Technology Licensing, LLC, Redmond, WA (US)

(72) Inventor: Gregory M. Daly, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 291 days.

(21) Appl. No.: 14/860,393

(22) Filed: Sep. 21, 2015

(65) Prior Publication Data

US 2017/0085084 A1    Mar. 23, 2017

(51) Int. Cl.
  *G06F 1/26*      (2006.01)
  *H02J 3/00*      (2006.01)
  *G05B 15/02*     (2006.01)
  *G06F 1/3287*    (2019.01)
  *H04N 21/443*    (2011.01)
  (Continued)

(52) U.S. Cl.
  CPC ............ *G06F 1/266* (2013.01); *G05B 15/02* (2013.01); *G06F 1/3215* (2013.01); *G06F 1/3287* (2013.01); *H02J 3/00* (2013.01); *H04N 21/4436* (2013.01); *H02J 2007/0062* (2013.01); *Y02D 10/171* (2018.01)

(58) Field of Classification Search
  CPC ...... G06F 1/266; G06F 1/3203; G06F 1/3287; G06F 1/3296; H02J 2007/006; H02J 2007/0062; H04N 21/4436; Y02D 10/171
  See application file for complete search history.

(56) References Cited

U.S. PATENT DOCUMENTS 6,415,388 B1    7/2002 Browning et al.
6,433,512 B1    8/2002 Birkler et al.
(Continued)

FOREIGN PATENT DOCUMENTS

CA    2851983    8/2014

OTHER PUBLICATIONS

"International Search Report and Written Opinion", Application No. PCT/US2016/048810, dated Nov. 7, 2016, 12 pages.
(Continued)

*Primary Examiner* — Crystal J Barnes-Bullock
(74) *Attorney, Agent, or Firm* — Rainier Patents, P.S.

(57) ABSTRACT

Accessory-based power distribution techniques are described. In one or more implementations, power available from a power system of a computing device is intelligently and adaptively distributed between device systems and accessories in accordance with a current usage scenario. To do so, a power manager operates to collect information regarding the current usage scenario, including system state information and a power draw level for accessory devices. Power available from the power system is then divided between the device systems and accessories in dependence upon the usage scenario, such as by establishing and applying power limits dynamically based on the usage scenario. For instance, as system power level for device subsystems may be reduced to provide more power for accessories in some scenarios. Likewise, power for accessories may be limited to enable a high performance mode for device operations in scenarios in which the system is operating near applied limits.

20 Claims, 7 Drawing Sheets

(51) Int. Cl.
*G06F 1/3215* (2019.01)
*H02J 7/00* (2006.01)

(56) References Cited

U.S. PATENT DOCUMENTS

| | | | |
|---|---|---|---|
| 7,487,371 B2* | 2/2009 | Simeral | G06F 1/28 713/300 |
| 7,529,948 B2 | 5/2009 | Conroy et al. | |
| 7,581,119 B2 | 8/2009 | Tupman et al. | |
| 7,596,686 B2* | 9/2009 | Dubinsky | G06F 1/3203 713/1 |
| 7,647,516 B2* | 1/2010 | Ranganathan | G06F 1/206 713/320 |
| 7,934,107 B2* | 4/2011 | Walrath | G06F 1/3287 713/300 |
| 8,069,355 B2* | 11/2011 | Simeral | G06F 1/28 713/300 |
| 8,266,456 B2 | 9/2012 | Chang et al. | |
| 8,504,823 B2 | 8/2013 | Carpenter et al. | |
| 8,604,753 B2* | 12/2013 | Bessa | H02J 7/0044 320/101 |
| 8,694,719 B2 | 4/2014 | Lassa et al. | |
| 8,884,586 B2 | 11/2014 | Li et al. | |
| 8,904,217 B2* | 12/2014 | Harris | G06F 1/3206 713/100 |
| 8,924,758 B2 | 12/2014 | Steinman et al. | |
| 9,223,375 B1* | 12/2015 | Samorukov | H02J 7/0054 |
| 9,454,193 B2* | 9/2016 | Anderson | G06F 3/0619 |
| 9,588,563 B2* | 3/2017 | Rathi | G06F 1/266 |
| 9,594,415 B2* | 3/2017 | Obie | G06F 1/266 |
| 2007/0088967 A1* | 4/2007 | Fu | G06F 1/266 713/340 |
| 2007/0143640 A1* | 6/2007 | Simeral | G06F 1/28 713/320 |
| 2008/0178032 A1* | 7/2008 | Walrath | G06F 1/3287 713/340 |
| 2012/0297215 A1* | 11/2012 | Saba | G06F 1/3203 713/320 |
| 2012/0311357 A1 | 12/2012 | Andrews | |
| 2014/0095899 A1 | 4/2014 | Sultenfuss et al. | |
| 2015/0006925 A1 | 1/2015 | Branover et al. | |
| 2015/0089248 A1 | 3/2015 | Obie et al. | |
| 2015/0089249 A1* | 3/2015 | Hannon | G06F 9/5094 713/300 |
| 2015/0134983 A1* | 5/2015 | Samorukov | H02J 7/0054 713/300 |
| 2015/0160674 A1* | 6/2015 | Burdette | G05F 1/66 700/295 |
| 2015/0241943 A1 | 8/2015 | Allen-Ware et al. | |
| 2016/0252943 A1* | 9/2016 | Varma | G06F 15/00 713/310 |
| 2017/0160790 A1* | 6/2017 | Obie | G06F 1/3287 |

OTHER PUBLICATIONS

Dey, Sabyasachi, "Power Management for Mobile Devices", Published on: May 5, 2006 Available at: http://www.drdobbs.com/mobile/power-management-for-mobile-devices/184407880.

"Second Written Opinion", Application No. PCT/US2016/048810, dated Sep. 6, 2017, 8 pages.

"International Preliminary Report on Patentability Issued in PCT Application No. PCT/US2016/048810", Dated: Dec. 14, 2017, 8 Pages.

* cited by examiner

ACCESSORY-BASED POWER DISTRIBUTION

BACKGROUND

Small form factor and mobile computing devices have been developed to increase the functionality that is made available to users in a mobile setting. For example, a user may interact with a compact gaming console, mobile phone, tablet computer, or other computing device to play games, interact with media content, check email, surf the web, compose texts, interact with applications, and so on. One challenge that faces developers of computing devices is efficient power management and extension of battery life, particularly for small devices.

SUMMARY

Accessory-based power distribution techniques are described. In one or more implementations, power available from a power system of a computing device is intelligently and adaptively distributed between device systems and accessories in accordance with a current usage scenario. To do so, a power manager operates to collect information regarding the current usage scenario, including system state information and power draw by accessory devices. Power available from the power system is then divided between the device systems and accessories in dependence upon the usage scenario, such as by establishing and applying power limits dynamically based on the usage scenario. For instance, as system power level for device subsystems (e.g., a processing system, SOC, wireless hardware, and/or other components) may be reduced to provide more power for accessories in some scenarios. Likewise, power for accessories may be limited to enable a high performance mode for device operations in scenarios in which the system is operating near applied power limits.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

A host device has limited availability of power from an internal power system (e.g., an internal power supply and/or battery system). Consequently, performance of the host device can be adversely affected by accessory devices that connect to and use power from the host device's power system because available power is shared by the host and connected accessories. To avoid overdrawing of the power system traditional designs may fix reserved amounts of power for both device systems and accessories. Since the power balance is fixed in this approach, flexibility is decreased, power is allocated inefficiently, and device performance may suffer. Additionally, the device designer may have to limit the number of accessory ports and/or power supplied to the accessories to keep power usage within the reserved power amount.

Accessory-based power distribution techniques are described. Aspects of the techniques are described in the context of Universal Serial Bus (USB) accessories connectable to a host device that supports USB for communications and power exchange in accordance with USB standards, interface, protocols, and components. The techniques are not limited to USB, though, and accordingly accessories designed for other types of device interfaces and protocols that enable data/powered connections are also contemplated.

In one or more implementations, power available from a power system of a computing device is intelligently and adaptively distributed between device systems and accessories in accordance with a current usage scenario. To do so, a power manager operates to collect information regarding the current usage scenario, including system state information and power draw associated with accessory devices. The usage scenarios used to drive power management decisions may also reflect characteristics of the accessory devices such as the number, type, classes, capabilities, priorities, and/or states of the devices. Power available from the power system is divided between the device systems and accessories in dependence upon the usage scenario, such as by establishing and applying power limits dynamically based on the usage scenario. For instance, a system power level for device subsystems (e.g., a processing system, system-on-chip (SOC), wireless hardware, and/or other components) may be reduced to provide more power for accessories in some scenarios. Likewise, power for accessories may be limited to enable a high performance mode for device operations in scenarios in which the system is operating near applied limits.

Techniques for accessory-based power distribution described in this document enable scenario based adjustments to power limits and supplied power levels. Rather than fixing power limits at design levels, power limits are set based on observed conditions during device operations and can be adjusted for different scenarios. In this approach, the full power of the power system can be used for the system in a high performance mode. Further, in appropriate circumstances additional power can be diverted to service accessories by limiting the power level for the processing system and/or other device systems. Consequently, the available power of the power system is used more efficiently and power usage is dynamically tailored to different usage scenarios. Device performance is increased by intelligently supplying more power to components when needed and conserving power at other times.

In the following discussion, an example environment and devices are first described that may employ the techniques described herein. Example details and procedures are then described which may be performed in the example environment and by the devices as well as in other environments and by other devices. Consequently, implementation of the example details and procedures is not limited to the example environment/devices and the example environment/devices are not limited to the example details and procedures.

Example Operating Environment

Figure 1:
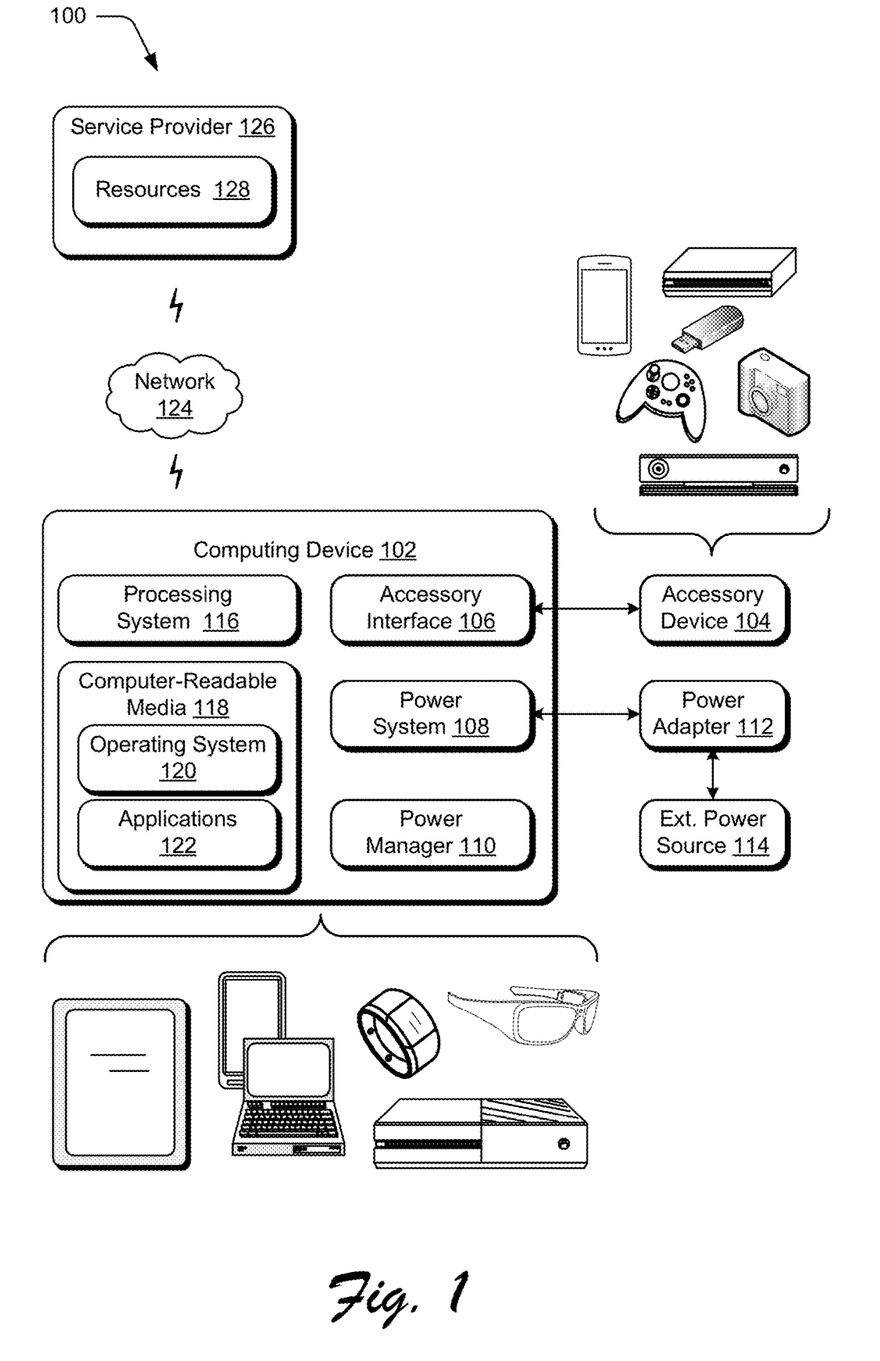
FIG. 1 is an illustration of an environment in an example implementation that is operable to employ the techniques described herein.

FIG. 1 is an illustration of an environment 100 in an example implementation that is operable to employ the techniques described herein. The illustrated environment 100 includes an example of a computing device 102 may be physically and communicatively coupled to an accessory device 104 via an accessory interface 106. The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, a wearable device (e.g., watch, band, glasses, etc.), and the like. Thus, the computing device 102 may range from full resource devices with substantial memory and processor resources to a low-resource device with limited memory and/or processing resources. The computing device 102 may also include or make use of software that causes the computing device 102 to perform one or more operations.

An accessory device 104 may also be configured as various different types or classes of devices. An accessory device 104 may assume a variety of different configurations to support a variety of different functionality. Examples of accessory devices represented in FIG. 1 include a digital camera, a game controller, a flash drive, an external hard drive, a mobile phone, and a sensor array device.

Different accessory devices may be connected to the computing device at different times via the accessory interface 106. For example, the accessory device may be physically attached to the computing device via cables, ports, and connectors that enable users to easily connect and remove different accessories using manual force (e.g., without the use of tools or complex disassembly). Generally, the accessory interface 106 represents hardware, software, logic, and connectors that are suitable to establish connections with compatible accessories. The accessory interface 106 further represents functionality to support both data communications and power exchange between the computing device and connected accessories. In one or more implementations, the accessory interface 106 is configured as a Universal Serial Bus (USB) interface which implements corresponding standards, protocols, ports, connectors and components. Accordingly, accessory devices may be configured as USB compatible devices that are connectable via an accessory interface 106 that supports communications and power exchange in accordance with USB. The techniques are not limited to USB, and accordingly accessories designed for other types of device interfaces and protocols that enable data/powered connections are also contemplated, including both other standard interfaces and proprietary implementations of accessory interfaces.

As further illustrated in FIG. 1 the computing device 102 may include a power system 108 and power manager 110. The power system 108 represents functionality to obtain power, store power, and distribute the power to components of the device. The power system may include an internal power supply unit used to power the device when connected to an external source of power. For example, the power system may be connected to and/or communicate with a power adapter 112 configured to supply power to the device via a suitable external power source 114, such as a wall socket, external battery, power system unit, or other of power source. In addition or alternatively, the power system may include one or more internal batteries or battery cells designed to store energy and operate as an internal energy source to power the device when power from external sources is not available (e.g., the device is unplugged). The internal batteries/cells may be charged via the power adapter 112 when connected to an energy source to store power for later use. The power system 108 may further operate as a converter to covert power into a form suitable for the device and different components thereof. Power available via the power system 108 may be distributed to different device systems via a system power bus as well as to connected accessories via the accessory interface. The power system 108 may operate under the influence of the power manager 110, which can cause the power system 108 to selectively make different levels of power available to different systems and components in accordance with techniques described herein.

In particular, the power manager 110 represents functionality to perform various operations for power management. This may include management of different power sources and switching between the sources, implementing a defined and/or selected power management scheme, managing battery life, and so forth. Additionally, the power manager 110 implements techniques for accessory-based power distribution techniques. In general, accessory-based power distribution techniques involve selectively controlling a balance between supplying power to the system and supplying power to connected accessories. In this context, the power manager 110 implements functionality to intelligently and adaptively distribute power between the device systems and accessories in accordance with a current usage scenario. For instance, the power manager 110 may collect information regarding the current usage scenario, including system state information and power draw by accessory devices. The usage scenarios used to drive power management decisions may also reflect characteristics of the accessory devices such as the number, type, classes, capabilities, and/or states of the devices. Different power levels or limits may be mapped to different usage scenarios that the power manager is configured to recognize. The power manager 110 then operates to set and apply scenario-based power management settings to divide available power between the device systems and accessories. This includes limiting or throttling the power that is made available to the system to better service connected accessory devices in appropriate circumstances. Details regarding these and other aspects are described in relation to the following figures.

The power manager 110 may be implemented in hardware, software, firmware and/or combinations thereof. By way of example and not limitation, the computing device 102 may include a microcontroller or other suitable hardware logic device configured to implement various functionally that is described herein in relation to the power manager 110. The power manager 110 may therefore represent firmware or logic associated with a suitable hardware logic device. In addition or alternatively, the power manager 110 may be implemented by way of a processing system of the device and one or more program modules that are executable/operable via the processing system.

The computing device 110 is further represented as having a processing system 116 with one or more processors and processing components (e.g., CPUs, GPUs, microcontrollers, hardware elements, a system-on-chip (SOC), fixed logic devices, etc.), one or more computer-readable media 118, an operating system 120, and one or more applications 122 that reside on the computer-readable media and which are executable by the processing system. The processing system 116 may retrieve and execute computer-program instructions from applications 122 to provide a wide range of functionality for the computing device 110, including but not limited to gaming, office productivity, email, media management, printing, networking, web-browsing, and so forth. A variety of data and program files related to the applications 122 can also be included, examples of which include games, office documents, multimedia files, emails, data files, web pages, user profile and/or preference data, and so forth. Implementations of a computing device as a system-on-chip (SOC) are also contemplated. An SOC is an integrated circuit (IC) that integrates various distinct components and functionality of a traditional computing system into a single chip.

The computer-readable media 118 can include, by way of example and not limitation, all forms of volatile and nonvolatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 7.

The environment further depicts that the computing device 102 may be communicatively coupled via a network 124 to a service provider 126, which enables access to and interaction with various resources 128 made available by the service provider 120. The resources 128 can include any suitable combination of content and/or services typically made available over a network by one or more service providers. For instance, content can include various combinations of text, video, ads, audio, multimedia streams, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service.

Figure 2:
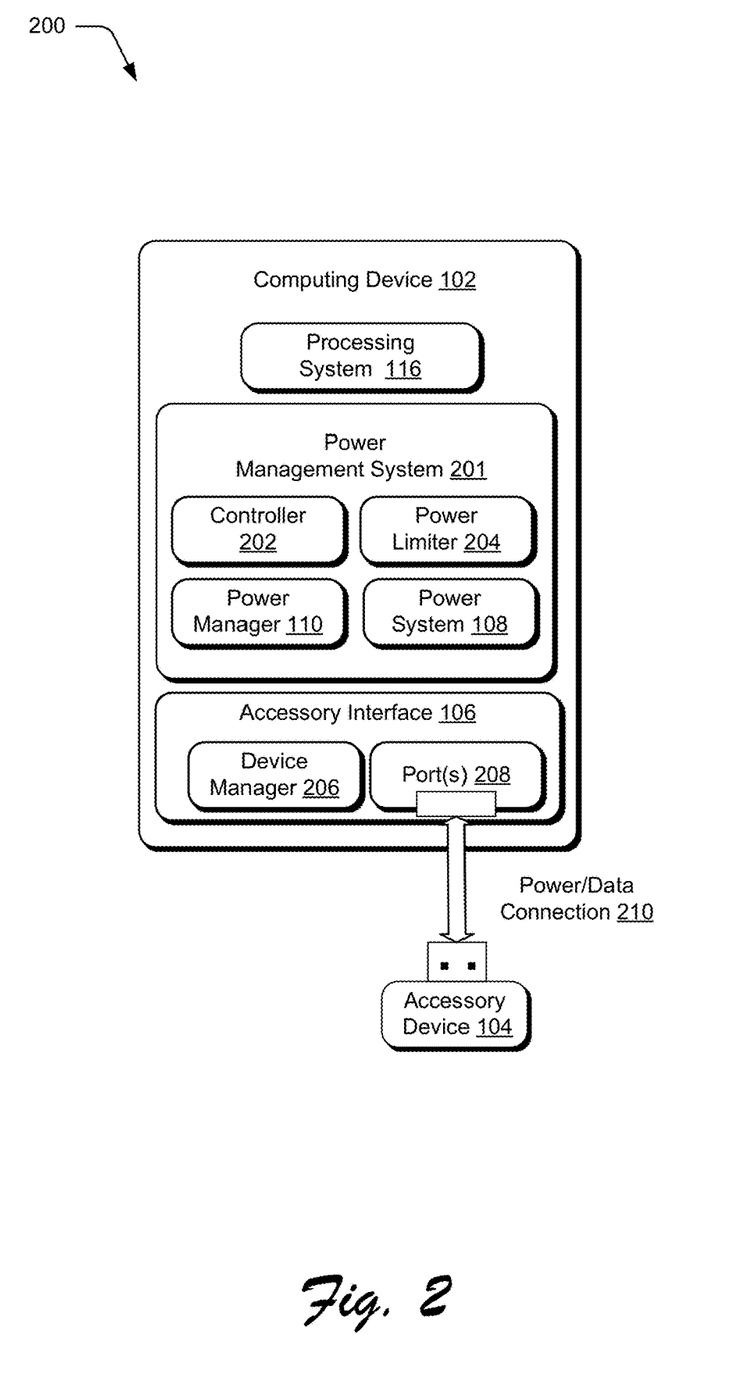
FIG. 2 depicts an example implementation of a computing device connectable to an accessory device in greater detail.

Having considered an example environment, consider now a discussion of example details of techniques for accessory-based power distribution in accordance with one or more implementations, Example Accessory-Based Power Distribution Details FIG. 2 depicts generally at 200 an example computing device 102 that can connect to and interact with an accessory device 104 in greater detail. In FIG. 2, the computing device 102 is depicted as implementing a power management system 201 that includes the power manager 110 and power system 108 as discussed in relation to FIG. 1. The power management system 201 may additionally include a controller 202 and a power limiter 204 component.

The controller 202 represents hardware such as a system-on-chip or one or more microcontroller(s) or micro-processing unit(s) (µP)) designed to perform a predefined set of designated tasks. In this example, the controller 202 is configured to implement power management related functions and tasks including but not limited to functionality represented by the power manager 110. Thus, the controller 202 may represent an on-chip system/circuit having self-contained resources such as processing components, I/O devices/peripherals, various types of memory (ROM, RAM, Flash, EEPROM), programmable logic, and so forth. Generally, power consumption of the controller 202 is low in comparison with operating a general purpose processing system for a device. As represented, the computing device may also include a separate processing system 116, although various devices and implementations may employ a controller 202 in the form of a SOC, in which case the separate processing system 116 may or may not be omitted.

The power limiter 204 component represents hardware operable to selectively control amounts of power from the power system 108 available for use by different components. For example, the power limiter 204 may be directed by the power manager to implement power limits that are established for different usage scenarios. The power limiter 204 may be configured in various ways such as incorporating switching mechanisms, diodes, and/or converters to control the amount of power distributed to different parts of the system as well as to connected accessory devices. In one or more implementations, the power limiter 204 may include one or more current limiting components designed to selectively provide different corresponding levels of power at different times as directed by the power manager 110. Various different types of current limiting components are contemplated. For example, the current limiting components may include a constant current diode, voltage controlled transistor, or current regulating integrated circuit device designed to maintain current at a particular level. Switching circuits and logic may be implemented to selectively route the power supply to accessories through the current limiting components and thereby control the level of power that is delivered. Multiple different current limiting components designed to provide different levels of current may be used along with the switching circuits and logic to enable selective switching between multiple different available levels of current.

In the example of FIG. 2, the accessory interface 106 is additionally represented as including a device manager 206 and ports 208 that to facilitate power/data connections 210 with accessory devices 104. The device manager 206 operates as a host that is responsible to detect connection and disconnection of devices to the ports 208 and expose connected device to the operating systems, applications, and other components. In particular, connected devices are enumerated via the device manager 206 and then may be exposed as available devices. The device manager 206 may further obtain and maintain information regarding characteristics associated with devices such as device types, classes of devices, capabilities, and/or states of the devices. The characteristic information can be used to inform power management decisions, such as by assigning different priorities with respect to power draw for different classes of accessories and setting power limits differently based on the priorities. For example, a hard disk or flash drive associated with critical data operations will have relatively high priority since the functions of these devices rely upon the supplied power. On the other hand, watches or other wearable items, game controllers, and mobile phones may be connected primarily for charging and may have correspondingly low priority with respect to power draw. The power manager 110 in conjunction with information supplied via the device manager 206 is able to recognize, classify, and distinguish between devices that are being used differently and have different characteristics and make power management decisions accordingly.

Accordingly, the power manager 110 is operable to perform operations to cause distribution of power via the power limiter 204 component based on a usage scenario. The usage scenarios reflect conditions, characteristics, and states for system components as well as for the connected accessories. The power manager 110 may be configured to obtain various data regarding the system and accessories and analyze the data to recognize different defined usages scenarios. Power management settings and power limits are then determined and applied according to the recognized scenario. When the usage scenario changes, the power management settings and power limits are adjusted accordingly.

Data utilized to make assessments of a current usage scenario includes but is not limited to system state information indicative of expected power usage by the processing system (and other device systems), such as the current operational mode, processing workload, application(s) being used, task and application priorities, and other factors that determine how much power is consumed and how important the ongoing system operations are relative to supporting accessories. The usage scenarios additionally reflect the level or amount of power draw expected for accessory devices and characteristics of the accessory devices such as the number, type, classes, capabilities, states of the devices, and/or priorities assigned to different types or classes of accessories. The power draw level for accessories may correspond to predefined or default levels established for the power system. The power draw level may also be determined according to requests obtained from the accessories to request particular power levels. Power draw levels and characteristics information may be obtained via communications and power requests from the accessories, or by dedicated power monitoring circuitry, all of which may be handled via the device manager 206 and conveyed to the power manager 110.

Figure 3:
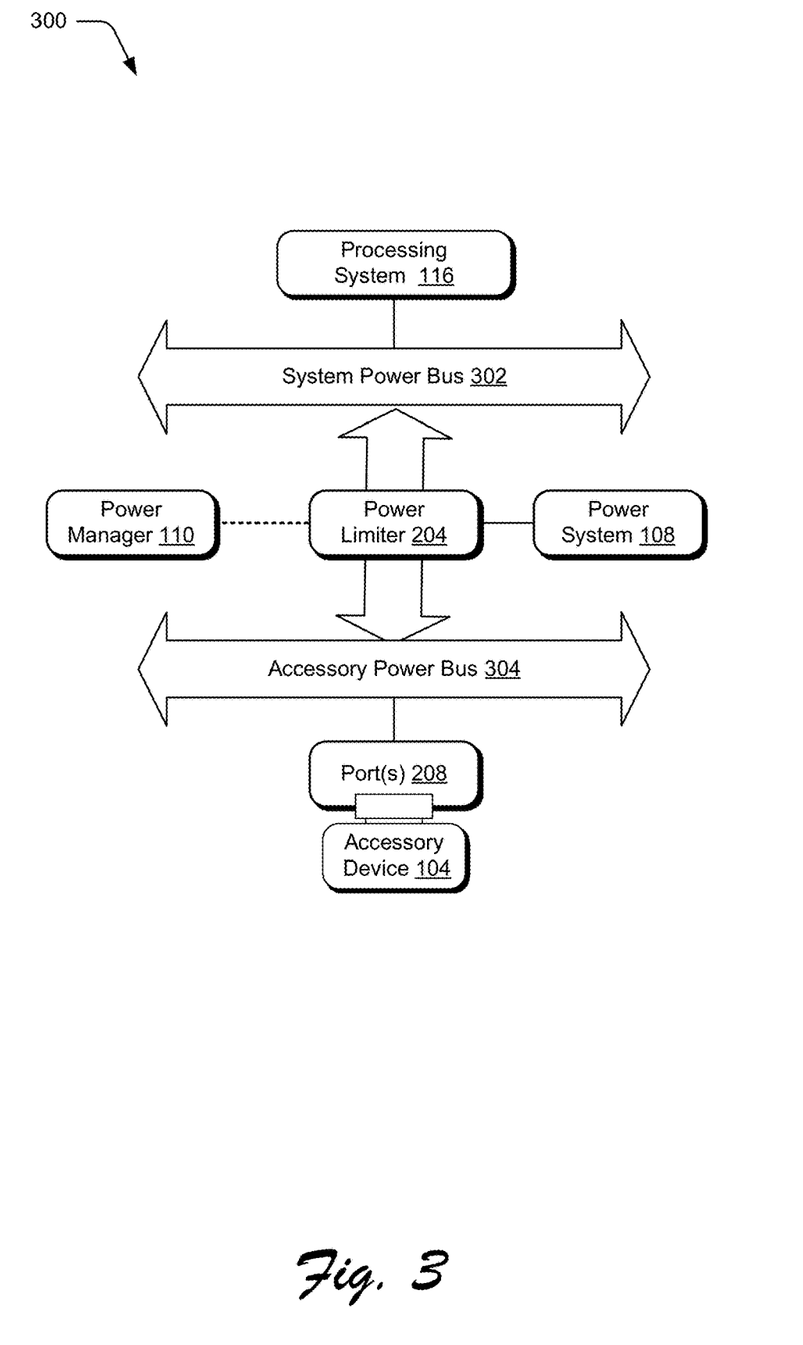
FIG. 3 which depicts an example scenario for power distribution in accordance with one or more implementations.

To further illustrate, consider FIG. 3 which depicts generally at 300 an example scenario for power distribution in accordance with one or more implementations. In the depicted example, a power system 108 is connected through a power limiter 204 to a system power bus 302 and an accessory power bus 304. A processing system 116 and/or other device systems and components are connected to the system power bus 302 to draw power. Likewise ports 208 for accessory devices are connected to the accessory power bus 304 in order to obtain power. The power limiter 204 operates under the influence of the power manager 110 to control the distribution of power between the system power bus 302 and an accessory power bus 304. This occurs by setting and adjusting power limits according to usage scenarios. In general, the full amount of available power is divided between the systems. In a simplified example, if the power system is capable of delivering 10 watts and the system limit is set at 7.5 watts, then the accessory limit would be 2.5 watts. If the system limit is increased to 9.5 watts, then the accessory limit decreases to 0.5 watts. In other words, power limits set for the device systems and accessory devices total a predefined level of power available from the power system. In other words the level of power the power system is designed to deliver is divided between the systems. The power limits and division of power is different for different usage scenarios.

In an implementation, the power system 108 is configured to provide accessory devices with at least two different power levels. This includes at least an initial power level to enable device enumeration and at least one higher power level (e.g., higher than the initial power level) for device operations and charging. Power available to the system is increased or decreased depending upon the power level being supplied to the accessory power bus 304 and accessories.

For instance, in the case of USB2.0 an initial "low" power level of 100 milliamps or 0.5 watts is specified, and a "high" power level of 500 milliamps or 2.5 watts is specified. According to the USB2.0 specification, connected devices operate at the low power level upon connection, and upon enumeration, can request a higher supply current. In traditional arrangements, though, the ports are often not controlled adequately, which means some devices are able to "steal" the higher power levels without enumerating. This drains available power and can limit system performance. Thus, one reason for implementation of the power management techniques described herein is to enable the system to have better control over power distribution and prevent such unmanaged uses of high power by accessories. Using the described techniques, distribution of power may be controlled by configuring the power limiter component to supply the initial power level or a higher power level to the one or more accessory device in dependence on the usage scenario.

In particular, the power manager 110 may operate to obtain information indicative of a power draw level for accessory devices 104 connected to the ports 208. In one approach, the power draw level is set at a predefined level, such as default level or level used when devices initially connect. In addition, accessories may interact to request a particular power draw level. The requests may occur through interactions with a device manager 206 or otherwise. In addition, the power manager 110 collects system state information indicative of expected power usage by the processing system. Power limits for a processing system 116 (and other system components) and the ports 208 are then established based at least in part on the power draw level that is established for accessories and the expected power usage. For example, a current usage scenario can be recognized based upon an assessment of the power draw requested, the expected power usage, and/or other factors. The assessment may involve comparing collected information and parameters to a defined set of usage scenarios to identify a scenario that matches the current conditions as the current usage scenario. The power manager 110 may then look-up pre-established power settings and limits that are associated with the set of usage scenarios. Alternatively, the power manager 110 may be configured to dynamically compute power limits "on-the-fly" based on observed data for the current usage scenario. Having obtained or computed appropriate power limits, the power manager 110 is configured to direct operations of the power limiter 204 component to apply the power limits and thereby divide power available from the power system 108 between the processing system 116 and the ports 208.

Having considered the preceding discussion of an example operating environment, and details, consider now a discussion of example procedures which includes further implementation details regarding the example techniques for accessory-based power distribution.

Example Procedures

The following discussion describes accessory device power management techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to the example operating environment 100 of FIG. 1 and the example devices and scenarios of FIGS. 2 and 3, respectively.

Figure 4:
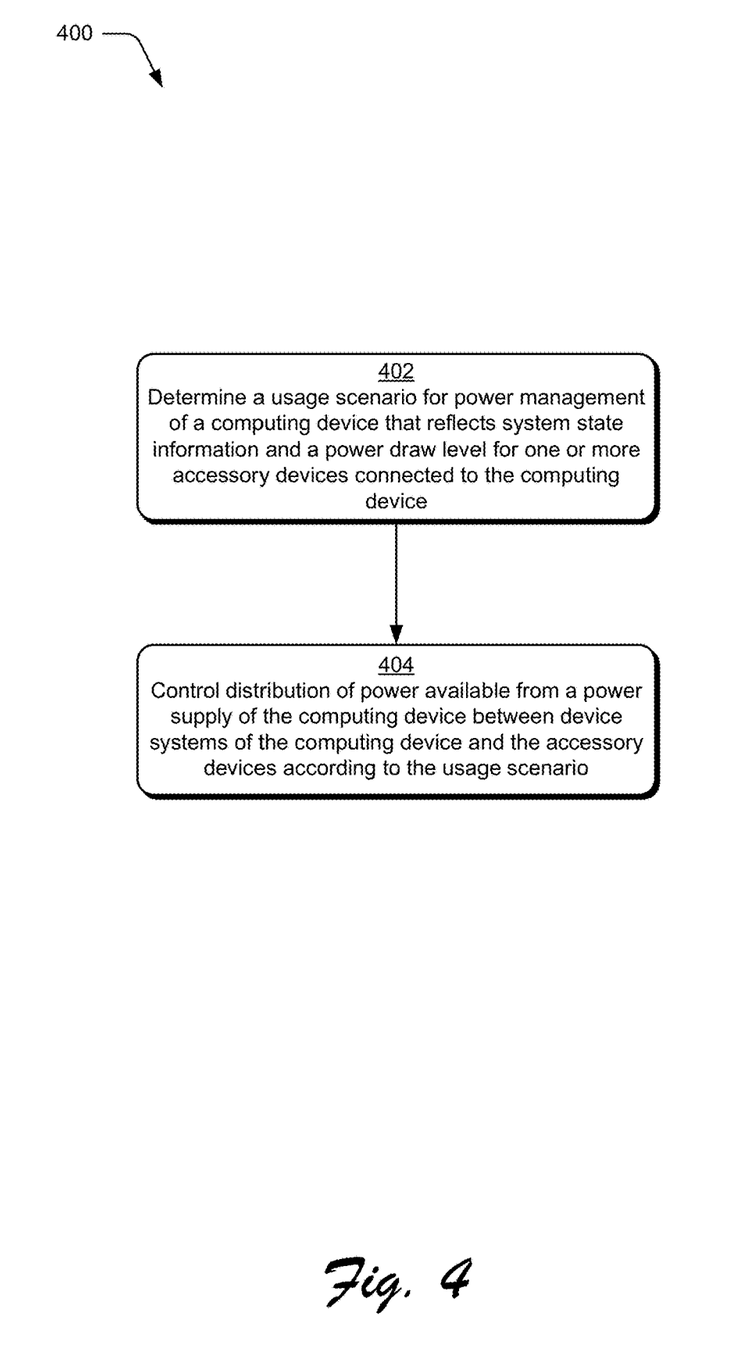
FIG. 4 depicts an example procedure in which power distribution is controlled based upon an ascertained usage scenario.

FIG. 4 depicts an example procedure 400 in which power distribution is controlled based upon an ascertained usage scenario. In at least some embodiments, the procedure may be performed by a suitably configured computing device, such as the example computing device of FIG. 1 or 2 that includes or otherwise make use of a power manager 110 and/or power management system 201 as discussed herein.

A usage scenario for power management of a computing device is determined that reflects system state information and a power draw level for one or more accessory devices connected to the computing device (block 402). Then, distribution of power available from a power system of the computing device between device systems of the computing device and the accessory devices is controlled according to the usage scenario (block 404). For example, different usage scenarios may be defined according to combinations of factors such as the power mode of the processor; thermal conditions; requested or defined power draw for accessories; priorities associated with tasks, applications, and accessories; workload; and other factors previously noted. A table, file, database or other suitable data structure may be maintained to specify the parameters for different scenarios. In another approach, parameters for different scenarios may be stored in hardware registers or a fixed or programmable logic component. The registers may include values for power thresholds that are mapped to corresponding factors. The power manager 110 may be configured to make use of the data structure or hardware registers to recognize scenarios that match observed conditions and states.

Power usage scenarios may therefore correspond to different combinations of system state information, power draw requested, and or other factors such as priorities and power system capabilities. For example, one usage scenario may be defined for a processing system operating in high performance mode and a low-priority connected accessory (such as a game control) that is charging. Another, different usage scenario may be associated with operating in high performance mode and a high-priority accessory that is actively being used (such as an external hard-drive). Different usage scenarios may also reflect different thermal conditions, power consumption history, battery states of charges, power availability, and so forth.

Having recognized the current usage scenario, the power manager 110 is configured to control distribution of power in accordance to the usage scenario. As noted, this may involve establishing and applying different power limits for different scenarios. Power limits for device systems and accessory devices are generally established to total the maximum amount of power available from the power system and are different for different usage scenarios. The limits may be computed in advance for defined scenarios and included as parameters in the data structure noted above. In this approach, applicable power limits for a current scenario may be looked-up from the data structure. Alternatively, the power manager 110 or another component may be configured to perform computations to calculate power limits according to a power limit formula/algorithm in response to recognitions of usage scenarios.

In at least some scenarios, controlling distribution involves setting or changing a limit on power that is available to device systems to provide additional power for use by the accessory devices. In other words, a processing system or SOC may be throttled under appropriate circumstance to "free-up" additional power for accessories. It is further noted that the processing system or SOC may be capable of operating in different modes such as a high performance mode and a power conservation mode. In this case, controlling distribution may include causing a change in operational modes for the processing system/SOC between a high performance mode and a power conservation mode in dependence upon the scenario.

Figure 5:
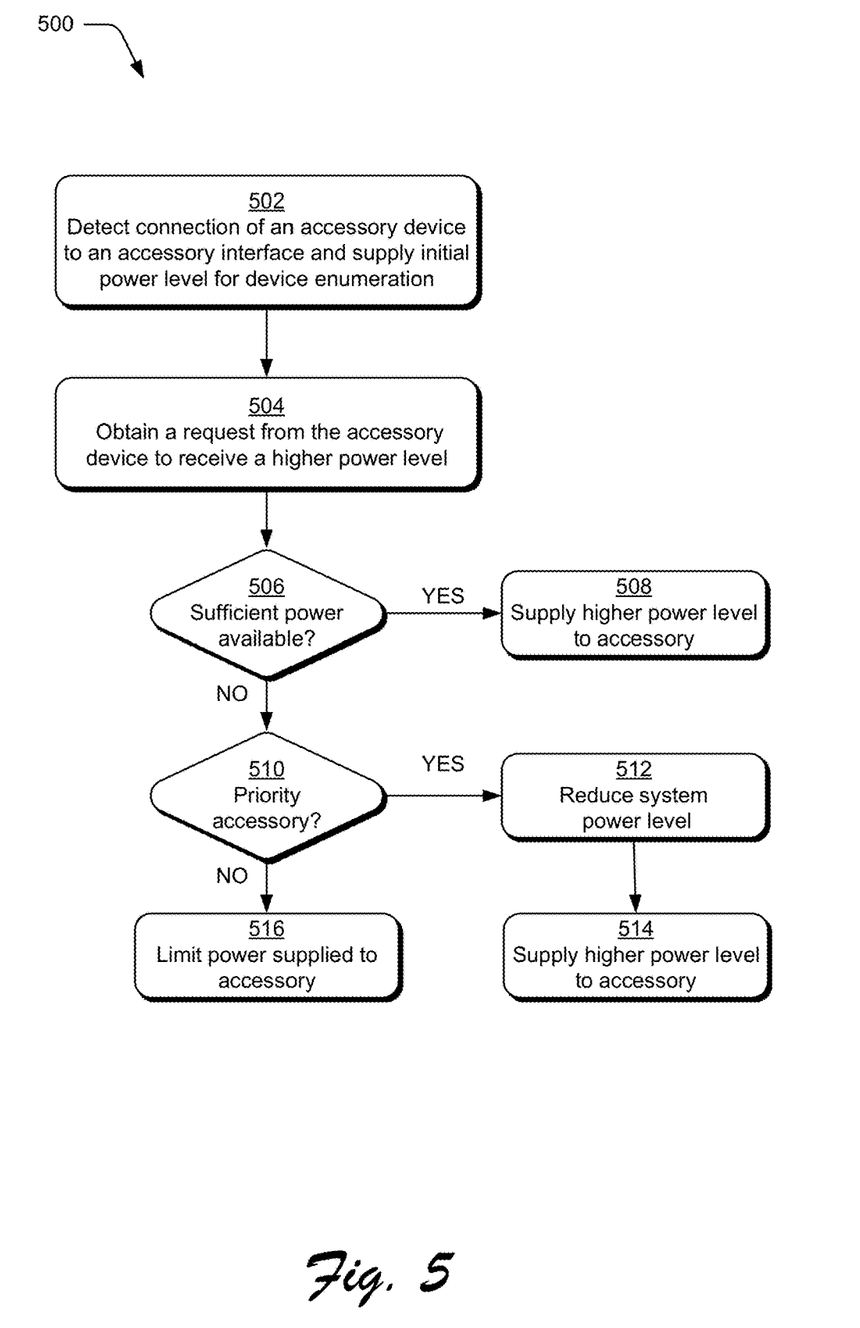
FIG. 5 depicts an example procedure in which a system power level is selectively reduced based in part upon accessory priority in accordance with one or more implementations.
Figure 6:
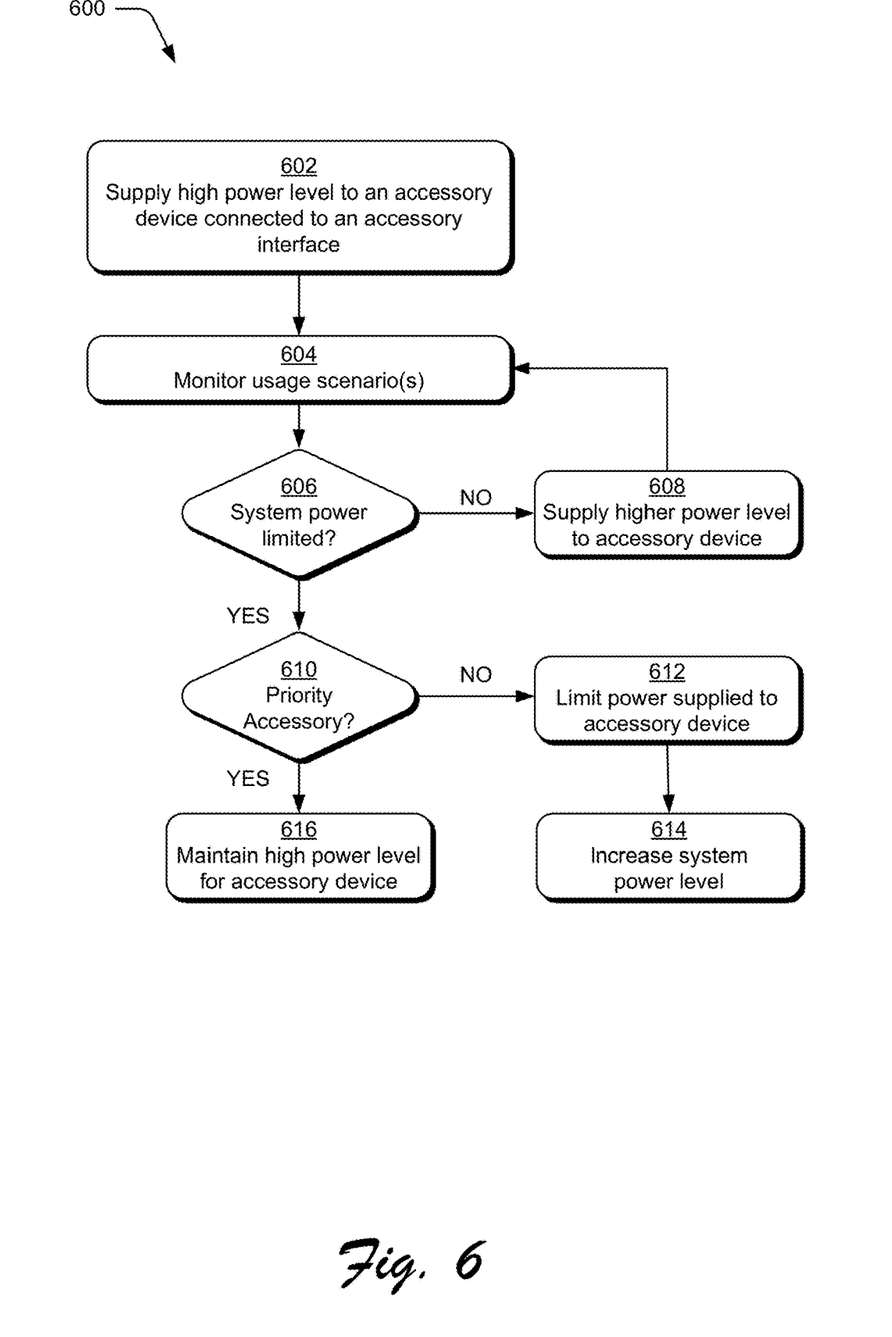
FIG. 6 depicts an example procedure in which system power level is selectively increased based the current usage scenario in accordance with one or more implementations.

By way of example and not limitations, some illustrative scenarios depicting example power management decision-making in accordance with the techniques described herein are discussed in relation to FIGS. 5 and 6. These scenarios are representative examples of how the system power level for a processing system, SOC, and other components may be adjusted up or down based on different usage scenarios. In particular, FIG. 5 depicts an example procedure 500 in which a system power level is selectively reduced based in part upon accessory priority in accordance with one or more implementations. Connection of an accessory device to an accessory interface is detected and an initial power level is supplied for device enumeration (block 502). For example, the connection of an accessory device 104 to a port 208 may be detected by a device manager 206. A low-level of power, such as 100 milliamps, may initially be supplied to enable the device to power-up and enumerate. Subsequently, a request is obtained from the accessory device to receive a higher power level (block 504). A determination is then made regarding whether sufficient power is available (block 506). Naturally, this determination depends upon the amount of power draw that is requested by the accessory, and as such the overall analysis is dependent upon the power draw also. If sufficient power is available, the higher power level is supplied to the accessory (block 508).

On the other hand, if sufficient power is not available, processing proceeds to determine whether to reduce power supplied to the system in favor of servicing the accessory request for more power. In traditional systems that use fixed power limits, such a determination would not be necessary because the fixed limits carve out power for the system and accessories. In accordance with the described techniques, though, the limits are scenario based and in some circumstances the power of the processing system/SOC can be reduced to free-up more power for accessories. The decision regarding whether to reduce system power depends at least in part upon priority of the accessory relative to the system activity or workloads.

Accordingly, a determination is made regarding whether the accessory is considered a priority accessory (block 510). Here, the power manager 110 determines if the accessory has sufficient priority to trigger a reduction in system power. The priority may depend upon the type or class of device as noted previously. In addition, the priority level sufficient to trigger a reduction may vary for different usage scenarios. For example, accessory priority level may have to be greater than priority assigned to the system workload in order for the accessory to be deemed as having sufficient priority.

When the accessory is considered as having sufficient priority, the system power level is reduced (block 512) and the higher power is supplied to the accessory (block 514). On the other hand, when the accessory lacks sufficient priority, power supplied to the accessory remains limited (block 516).

FIG. 6 depicts an example procedure 600 in which system power level is selectively increased based the current usage scenario in accordance with one or more implementations. A high power level is supplied to an accessory device connected to an accessory interface (block 602). For example, a decision to supply high power to an accessory may be made in accordance with example procedure 500 just described. During operations, usage scenarios are monitored (block 604). As part of the monitoring, system state information may be collected and analyzed. Among other things, the analysis checks whether the system is power limited (block 606). For example, if the average power usage is close to and/or "bumping-up" against the system power limit, then the system is considered power limited. In addition, examination of workloads and user activity may enable a prediction that more system power is likely to be needed shortly, in which case the system may also be considered power limited.

As long as the system is not limited, the supply of high power continues to the accessory device connected to the accessory interface (block 608), and the procedure loops back to monitoring per block 604. On the other hand, when the system is limited an assessment of priorities is made to determine if the accessory is a priority accessory (block 610). This priority assessment may occur in the same manner and using the same criteria as the priority assessment discussed in relation to block 510 of FIG. 5. Here, when the accessory is deemed not to have sufficient priority, power supplied to the accessory is limited (block 612) and the system power level is increased (block 614). When the accessory does have sufficient priority, though, the high-power level is maintained for the accessory device (block 616). In this case, the performance of the system (e.g., processing system, SOC, and/or other device components) is throttled to a lower level of performance based on current usage scenario and accessory priority.

Having considered the foregoing example procedures, consider now a discussion of example systems and devices that may be employed to implement aspects of accessory-based power distribution techniques in one or more embodiments.

Example System and Device

Figure 7:
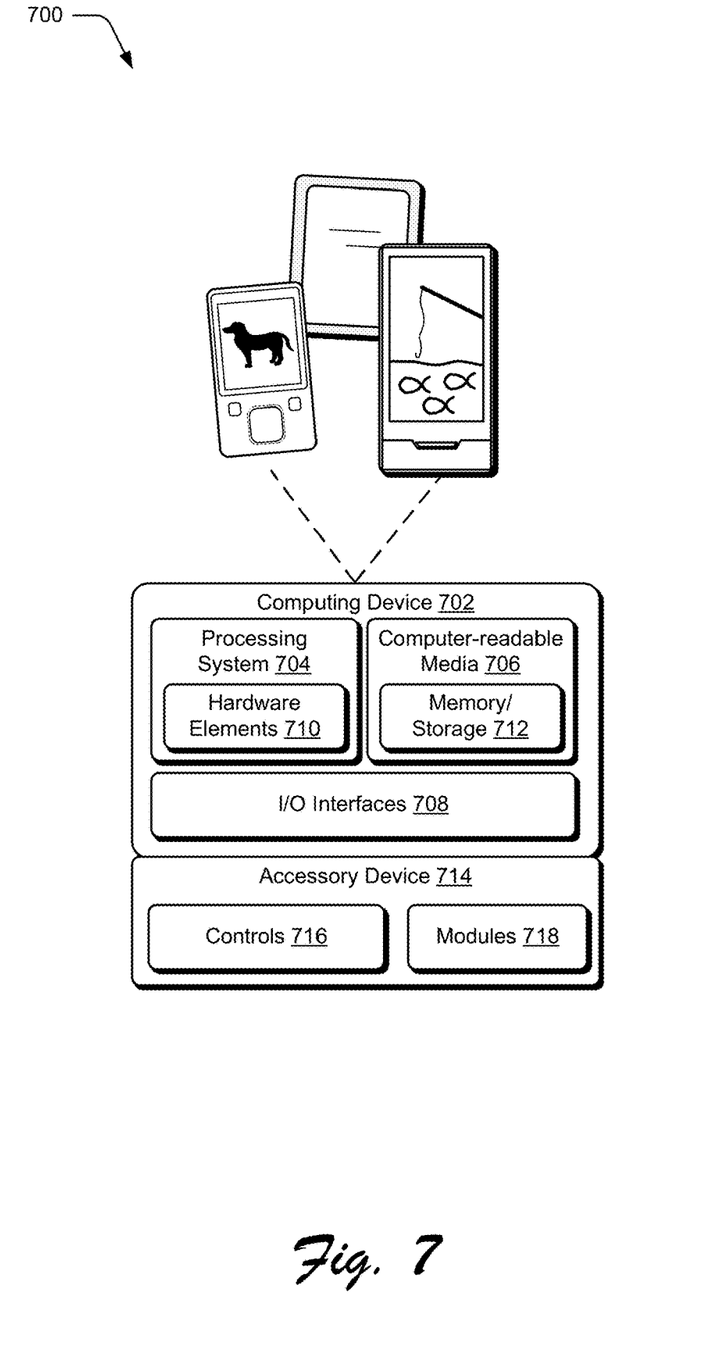
FIG. 7 illustrates an example system including various components of an example device that can be implemented as any type of computing device to implement embodiments of the techniques described herein.

FIG. 7 illustrates an example system generally at 700 that includes an example computing device 702 that is representative of one or more computing systems and/or devices that may implement the various techniques described herein. The computing device 702 may, for example, configured to assume a mobile or small form factor configuration through use of a housing formed and sized to be grasped and carried by one or more hands of a user, examples of which include but are not limited to a mobile phone, small form gaming console, a multimedia device, and a tablet computer.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways to support user interaction.

The computing device 702 is further illustrated as being communicatively and physically coupled to an accessory device 714 that is physically and communicatively removable from the computing device 702. In this way, a variety of different input devices may be coupled to the computing device 702 having a wide variety of configurations to support a wide variety of functionality. In this example, the accessory device 714 includes one or more controls 716, which may be configured as press-sensitive keys, mechanically switched keys, buttons, and so forth.

The accessory device 714 is further illustrated as include one or more modules 718 that may be configured to support a variety of functionality. The one or more modules 718, for instance, may be configured to process analog and/or digital signals received from the controls 716 to determine whether an input was intended, determine whether an input is indicative of resting pressure, support authentication of the accessory device 714 for operation with the computing device 702, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable storage of information in contrast to mere signal transmission, carrier waves, or signals per se. Thus, computer-readable storage media does not include signals per se or signal-bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, microcontroller devices, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

EXAMPLE IMPLEMENTATIONS

Example implementations of techniques described herein include, but are not limited to, one or any combinations of one or more of the following examples:

Example 1

A method implemented by a computing device comprising: determining a usage scenario for power management of the computing device that reflects at least system state information and a power draw level for one or more accessory devices connected to the computing device; and controlling distribution of power available from a power system of the computing device between device systems of the computing device and the accessory devices according to the usage scenario.

Example 2

A method as described in any one or more of the examples in this section, wherein the power system is designed to supply up to a predefined power level and controlling distribution comprises establishing and applying power limits for the device systems and accessory devices that total the predefined power level and are different for different usage scenarios.

Example 3

A method as described in any one or more of the examples in this section, wherein controlling distribution includes setting a limit on power that is available to device systems to provide additional power for use by the accessory devices.

Example 4

A method as described in any one or more of the examples in this section, wherein the device systems of the computing device comprise at least a processing system.

Example 5

A method as described in any one or more of the examples in this section, wherein controlling distribution includes causing a change in operational modes for the processing system between a high performance mode and a power conservation mode.

Example 6

A method as described in any one or more of the examples in this section, wherein the processing system comprises a system-on-chip (SOC).

Example 7

A method as described in any one or more of the examples in this section, wherein the system state information includes thermal conditions, processing system mode, and power usage history data indicative of expected power usage by the device systems.

Example 8

A method as described in any one or more of the examples in this section, determining the usage scenario comprises establishing priorities for the one or more accessory devices with respect to power distribution, wherein: different classes of accessory devices are associated with different priorities with respect to power draw; and controlling distribution of power comprises using the priorities to determine whether to limit power supplied to device systems and establish how much of the available power to supply to the accessory devices.

Example 9

A method as described in any one or more of the examples in this section, wherein: the power system is configured to provide accessory devices with at least two different power levels including: an initial power level for device enumeration and a higher power level that is higher than the initial power level for device operations and charging; and controlling distribution of power comprises configuring a power limiter component to supply the initial power level or the higher power level the one or more accessory device in dependence the usage scenario.

Example 10

A method as described in any one or more of the examples in this section, wherein the one or more accessory devices comprise universal serial bus (USB) devices connectable to the computing device and power system via one or more USB ports implemented by the computing device.

Example 11

A computing device comprising: a processing system and one or more ports for accessory devices connected to a power system configured to provide power for operation of the processing system and accessory devices connected to the computing device via the ports; a power limiter component operable to selectively apply power limits to control amounts of power from the power system available for use by the processing system and the ports; and a power manager operable to perform operations to cause distribution of power via the power limiter component including: obtaining information indicative of a power draw level for accessory devices connected to the ports; collecting system state information indicative of expected power usage by the processing system; establishing power limits for the processing system and the ports based upon the power draw level and the expected power usage; and directing operation of the power limiter component to apply the power limits to divide power available from the power system between the processing system and the ports.

Example 12

A computing device as described in any one or more of the examples in this section, wherein the processing system comprises a system-on-chip (SOC).

Example 13

A computing device as described in any one or more of the examples in this section, wherein ports comprise universal serial bus (USB) ports for connection of USB compatible devices.

Example 14

A computing device as described in any one or more of the examples in this section, wherein: the power manager is further operable to identify different classes of accessories connected to the ports; different classes of accessory devices are associated with different priorities with respect to power draw; and establishing the power limits comprises setting the power limits to restrict power supplied to the processing system in order to supply more power to the ports responsive to identifying at least one accessory device associated with priority of a designated level connected via the ports.

Example 15

A computing device as described in claim 11, further comprising a system bus to which the processing system is connected an accessory power bus to deliver power to the ports, wherein the power limiter is configured to divide power available from the power system between the system power bus and the accessory power bus.

Example 16

A computing device as described in any one or more of the examples in this section, wherein the power limiter comprises one or more current limiting components.

Example 17

A computing device comprising: a system-on-chip (SOC); an accessory interface connectable to one or more accessory devices; a power system configured to provide power for operation of the SOC and accessory devices connected to the computing device; and a power manager operable to control distribution of available power from the power system between the SOC and the accessory interface, the power manager configured to selectively restrict power supplied to the SOC to supply additional power to the one or more accessory devices based upon an assessment of a current usage scenario.

Example 18

A computing device as described in any one or more of the examples in this section, wherein restricting power supplied to the SOC comprises causing the SOC to switch from a performance mode to a low-power mode to make more power available from the power system for the one or more accessory devices.

Example 19

A computing device as described in any one or more of the examples in this section, wherein restricting power supplied to the SOC comprises setting and applying a power limit that specifies a upper bound for power usage by the SOC.

Example 20

A computing device as described in any one or more of the examples in this section, wherein the assessment of the current usage scenario includes: obtaining information indicative of a power draw level requested by accessory devices connected to the accessory interface; collecting system state information indicative of expected power usage by the SOC; identifying priorities with respect to power draw associated with the accessory devices; and determining when to restrict power available to the SOC based upon the power draw level requested, the expected power usage, and the priorities.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method implemented by a computing device, the method comprising:
   determining a usage scenario for power management of the computing device that reflects at least system state information and a power draw level for one or more detachable accessory devices connected to one or more ports of the computing device; and
   controlling distribution of power available from a power system of the computing device between device systems of the computing device and the one or more detachable accessory devices according to the usage scenario, the distribution of power being controlled by, in at least one instance, limiting current supplied from the power system to an individual port of the computing device.

2. A method as described in claim 1, wherein the power system is designed to supply up to a predefined power level and the controlling distribution comprises establishing and applying power limits for the device systems and the one or more detachable accessory devices that total the predefined power level and are different for different usage scenarios.

3. A method as described in claim 1, wherein the controlling distribution includes reducing power that is available to the device systems to provide additional power to the one or more ports.

4. A method as described in claim 1, wherein the device systems of the computing device comprise at least a processing system.

5. A method as described in claim 4, wherein the controlling distribution includes causing a change in operational modes for the processing system between a high performance mode and a power conservation mode.

6. A method as described in claim 5, wherein the processing system comprises a system-on-chip (SOC).

7. A method as described in claim 1, wherein the system state information includes thermal conditions, processing system mode, and power usage history data indicative of expected power usage by the device systems.

8. A method as described in claim 1, wherein the determining the usage scenario comprises establishing priorities for the one or more detachable accessory devices with respect to power distribution, wherein:
   different classes of detachable accessory devices are associated with different priorities with respect to power draw; and
   the controlling distribution of power comprises using the priorities to determine whether to limit power supplied to the device systems and establish how much of the available power to supply to the one or more detachable accessory devices via the one or more ports.

9. A method as described in claim 1, wherein the controlling distribution of power comprises configuring a current limiting diode, transistor, or integrated circuit to reduce power supplied to the one or more ports in at least one instance and to reduce power supplied to the device systems in at least one other instance.

10. A method as described in claim 1, wherein the one or more detachable accessory devices comprise universal serial bus (USB) devices connectable to the computing device and power system, and the one or more ports comprise one or more USB ports.

11. A computing device comprising:
    a processing system and one or more ports for connecting one or more detachable accessory devices, the processing system and the one or more ports being connected to a power system configured to provide power for operation of the processing system and the one or more detachable accessory devices connected to the computing device via the one or more ports;
    a power limiter component operable to selectively apply power limits to control amounts of power from the power system supplied to the processing system and the one or more ports; and
    a power manager operable to perform operations to cause distribution of power via the power limiter component, the operations including:
    obtaining information indicative of a power draw level for the one or more detachable accessory devices connected to the one or more ports;
    collecting system state information indicative of expected power usage by the processing system;
    establishing power limits for the processing system and the one or more ports based at least upon the power draw level and the expected power usage; and
    directing operation of the power limiter component to apply the power limits to divide power available from the power system between the processing system and the one or more ports.

12. A computing device as described in claim 11, wherein the processing system comprises a system-on-chip (SOC).

13. A computing device as described in claim 11, wherein the one or more ports comprise one or more universal serial bus (USB) ports for connection of USB compatible devices.

14. A computing device as described in claim 11, wherein:
    the power manager is further operable to identify different classes of detachable accessories connected to the one or more ports;

different classes of detachable accessory devices are associated with different priorities with respect to power draw; and the establishing the power limits comprises setting the power limits to restrict power supplied to the processing system in order to supply more power to the one or more ports responsive to identifying at least one detachable accessory device associated with priority of a designated level connected via the one or more ports.

15. A computing device as described in claim 11, further comprising a system power bus to which the processing system is connected and an accessory power bus to deliver power to the one or more ports, wherein the power limiter component is configured to divide power available from the power system between the system power bus and the accessory power bus.

16. A computing device as described in claim 11, wherein the power limiter component comprises one or more current limiting components configured to physically limit current supplied to the one or more ports.

17. A computing device comprising:
 a system-on-chip (SOC);
 one or more ports connectable to one or more detachable accessory devices;
 power limiting hardware;
 a power system configured to provide power for operation of the SOC and the one or more detachable accessory devices connected to the one or more ports; and
 a power manager operable to control distribution of available power from the power system between the SOC and the one or more ports by, in at least one instance, selectively configuring the power limiting hardware to reduce power supplied to the SOC to supply additional power to the one or more ports based at least upon an assessment of a current usage scenario.

18. A computing device as described in claim 17, wherein reducing power supplied to the SOC comprises causing the SOC to switch from a performance mode to a low-power mode to make more power available from the power system for the one or more detachable accessory devices.

19. A computing device as described in claim 17, wherein the power limiting hardware comprises at least one diode, transistor, or current-regulating circuit.

20. A computing device as described in claim 17, wherein the power manager is operable to perform the assessment of the current usage scenario by:
 obtaining information indicative of a power draw level requested by the one or more detachable accessory devices connected to the one or more ports;
 collecting system state information indicative of expected power usage by the SOC;
 identifying priorities with respect to power draw associated with the one or more detachable accessory devices; and
 determining when to reduce power available to the SOC based at least upon the power draw level requested, the expected power usage, and the priorities.

* * * * *